(12) United States Patent
Hart (10) Patent No.: US 11,630,468 B2
(45) Date of Patent: Apr. 18, 2023

(54) FLOW RATE REGULATOR

(71) Applicant: Neoperl GmbH, Mullheim (DE)

(72) Inventor: Keith Hart, Worcestershire (GB)

( * ) Notice: Subject to any disclaimer, the term of this patent is extended or adjusted under 35 U.S.C. 154(b) by 308 days.

(21) Appl. No.: 16/479,756

(22) PCT Filed: Mar. 13, 2018

(86) PCT No.: PCT/EP2018/056223
§ 371 (c)(1),
(2) Date: Jul. 22, 2019

(87) PCT Pub. No.: WO2018/167052
PCT Pub. Date: Sep. 20, 2018

(65) Prior Publication Data
US 2021/0325913 A1    Oct. 21, 2021

(30) Foreign Application Priority Data
Mar. 13, 2017 (DE) .......................... 202017101427.4

(51) Int. Cl.
*G05D 7/01*    (2006.01)
*G01F 5/00*    (2006.01)

(52) U.S. Cl.
CPC ............. *G05D 7/012* (2013.01); *G01F 5/005* (2013.01)

(58) Field of Classification Search
CPC ........... Y10T 137/782; Y10T 137/7792; Y10T 137/789; G05D 7/012; G05D 7/0113; F16L 55/027
USPC ................................ 251/127, 30.03, 118, 120
See application file for complete search history.

(56) References Cited

U.S. PATENT DOCUMENTS

| | | | |
|---|---|---|---|
| 2,444,677 A | 7/1948 | Rosenblum | |
| 3,847,178 A | 11/1974 | Keppel | |
| 4,165,764 A * | 8/1979 | Grandclement | F16K 7/12 137/504 |
| 6,390,122 B1 | 5/2002 | Zhang et al. | |
| 6,571,831 B1 * | 6/2003 | Hart | G05D 7/012 138/45 |
| 7,143,992 B2 * | 12/2006 | Sassone | F16K 31/404 251/127 |
| 7,594,519 B2 * | 9/2009 | Hart | G05D 7/012 138/43 |
| 10,512,920 B2 * | 12/2019 | Twitchett | E03C 1/084 |
| 10,935,993 B2 * | 3/2021 | Hart | G05D 16/06 |
| 2007/0169262 A1 | 7/2007 | McDonald | |
| 2014/0137970 A1 * | 5/2014 | Bosio | F16L 55/027 138/40 |

FOREIGN PATENT DOCUMENTS

| | | | |
|---|---|---|---|
| DE | 29520069 | 3/1996 | |
| DE | 60207296 | 7/2006 | |
| DE | 102011120007 A1 * | 9/2012 | ............. G05D 7/012 |
| DE | 102016112514 A1 * | 1/2018 | |
| FR | 2731088 | 8/1996 | |
| WO | 03054436 | 7/2003 | |
| WO | 2013008199 | 1/2013 | |

* cited by examiner

*Primary Examiner* — Jessica Cahill
(74) *Attorney, Agent, or Firm* — Volpe Koenig (57) ABSTRACT

A flow rate regulator s provided that decouples regions (7) of a regulating body (2) of a flow rate regulator (1) such that one of the decoupled regions (7) forms a low-pressure region (9) while another of the decoupled regions (7) defines a high-pressure region (8).

14 Claims, 5 Drawing Sheets

FLOW RATE REGULATOR

BACKGROUND

The invention relates to a flow rate regulator having a deformable regulating body which is arranged on the inflow side with respect to a main body such that a control gap is formed between the regulating body and the main body, wherein at least one drain opening, arranged downstream of the control gap, is formed in the main body, wherein a clear opening area of the control gap is defined by an inflow pressure-dependent deformation of the regulating body.

Such flow regulators are known and are used in order to set a constant flow rate over a large pressure range, in particular in sanitary systems.

In the process, the regulator body deforms in a pressure-dependent manner and closes the control gap such that a constant flow rate (usually always with respect to a unit of time) is set overall over a regulating range of the pressure.

It is conventional to produce a plurality of support elements together with the main body as an injection-moulding. The desired flow rate is in this case definable by the arrangement and dimensioning of the support elements.

An ideal flow rate regulator would have a control curve, i.e. the dependence of the flow rate downstream the flow rate regulator as a function of the pressure difference across the flow rate regulator, which has a steep rise at low pressures and an essentially flat or constant plateau at high pressures. However, existing flow rate regulators may have a low-pressure behaviour that is less steep than desired and/or an unwanted ascending high-pressure part of the control curve.

SUMMARY

It is an object of the invention to provide a flow rate regulator with an improved control curve.

In order to achieve the object, one or more features of the invention are provided. Thus, in particular, in the case of a flow regulator as described at the beginning, the invention proposes, in order to achieve the object, that the control gap is divided into at least two separate regions such that the regulating body can be deformed in the at least two regions in an essentially decoupled manner such that one of the two separate regions, as a high-pressure region, essentially regulates a high-pressure behavior of the flow rate regulator while the other one of the two separate regions, as a low-pressure region, essentially regulates a low-pressure behavior of the flow rate regulator. Thus, the high-pressure and low-pressure behaviors may be designed independently of each other. One advantage is that the design of the high-pressure behavior, which is difficult to manage in practice, can be developed after a certain low-pressure behavior has been achieved, without destroying or influencing that low-pressure behavior. The invention uses the realization that the decoupling of the low-pressure and high-pressure behaviors allows for such individual design attempts since cross-influences between the at least two regions are suppressed or minimized. Thus, a low-pressure behavior with a steep part of the control curve and a high-pressure behavior with a flat part of the control curve may be achieved.

According to one embodiment of the invention, it is contemplated that the control gap is divided into the at least two separate regions by supporting elements that support the regulating body already at essentially zero inflow pressure. It has been found that resting the regulating body at supporting elements is an easily controllable means to decouple neighboring regions of the regulating body that are separated by said supporting elements.

It is advantageous if the support elements support the regulating body across the control gap. Thus, the supporting elements take on the forces acting on the regulating body such that an effective decoupling between regions as achieved.

In particular, the regulating body may be in contact with the supporting elements at and above a pressure below 0.1 bar. Thus, the decoupling starts at very low pressures so that the behavior of the flow rate regulator may be designed over a pressure range as wide as possible.

According to one embodiment of the invention, it is contemplated that supporting elements, in particular the supporting elements described above, are formed at the main body. Thus, the supporting elements may be formed together with the main body by injection molding. Here, although various forms and arrangements of supporting elements may be used, it is particularly advantageous if the supporting elements are formed as fixed protrusions. This allows a stable support of the regulating body.

According to one embodiment of the invention, it is contemplated that a distance between supporting elements defining the high-pressure region, wherein the distance is measured within the high-pressure region, is smaller than a distance between supporting elements defining the low-pressure region, wherein the distance is measured within the low-pressure region. The distance in the low-pressure region may be considerably larger than the distance in the high-pressure region. The distance in the low-pressure region may be at least two, at least five or at least ten or even at least twenty times the distance in the high-pressure region. If a part of the regulating body spans a wide distance, it will essentially determine the regulating behavior at low pressures. This is because the regulating body can be easily deformed if there are only few or sparse supporting elements. On the other hand, supporting elements that are arranged close to each other define high-pressure regions as a deformation of the regulating body in this region can be achieved at high pressures only.

According to one embodiment of the invention, it is contemplated that the high-pressure region is formed such that it remains at least partially open at all pressures. This avoids complete blockings of the flow.

In general, the distribution, number and form of the high- and low-pressure regions may be arbitrary and adapted to the desired control curve.

However, a preferred arrangement has only one low-pressure region. Thus, as much space as possible may be used for the low-pressure region. As a result, the regulating body may span the widest possible distance in order to provide a very flexible part of the regulating body that responds readily at very low pressures.

In another preferred arrangement, there are as many high-pressure regions as there are low-pressure regions.

Alternatively or additionally, there may be more than one high-pressure region. These high-pressure regions may be individually shaped in general. In a preferred arrangement, the high-pressure regions may be shaped identically. This may reduce the number of degrees of freedom in the design in order to simplify the design process to achieve a desired control curve.

In order to have identical conditions for all high-pressure regions, an arrangement of the regions such that an n-fold discrete symmetry is created is advantageous. This way, a given number of high-level regions may be provided such that all high-level regions have identical surroundings. Although the regulating body decouples at the boundary between two adjacent regions, there may be still some interaction for instance because of tensions carried in the material of the regulation body. Creating identical surroundings for all high-pressure regions is a way to render those interactions negligible.

According to one embodiment of the invention, it is contemplated that the low-pressure region is formed such that it is essentially closed above a pressure threshold. Thus, above that pressure threshold, the low-pressure region is essentially inactive and does not influence the regulating behavior.

According to one embodiment of the invention, it is contemplated that in the low-pressure region at least one intermediate element is disposed which is dimensioned such that it does not contact the regulating body below an intermediate pressure and that it supports the regulating body above the intermediate pressure. Thus, the intermediate elements will be inactive at low pressures, while at intermediate pressures an additional division of the regulating body into subregions occurs due to the intermediate element contacting the regulating body. Dividing the regulating body further in decoupled subregions on the low-pressure side is a means to shape the transition region between the low-pressure and high-pressure regions. Intermediate elements may avoid an excessive fluctuation of the control curve in the transition region. This is advantageous as the transition region may shift to high pressure values if there is a restriction downstream of the flow rate regulator. If the control curve showed large fluctuations in this case, dangerous flow rate peaks would occur. This principle may be continued to divide regions and subregions further.

In many cases, the intermediate element will be shorter than the supporting elements. For instance, it may be much shorter, in particular more than two, more than three or more than five times shorter.

In particular, the intermediate pressure may be below a pressure range in which the high-pressure region regulates the behavior. Thus, the intermediate element controls the behavior in the low-pressure range only.

Alternatively or additionally, the intermediate pressure may be below the pressure threshold. Thus, the influence of the intermediate elements on the control curve is eliminated above the low-pressure region.

Alternatively or additionally, the intermediate element is shorter than a supporting element, i.e. than the supporting element described above. Thus, at very low pressures, the regulation body may not touch the main body. In this manner, a deactivation of the intermediate elements at very low pressures and/or an automatic activation above a certain threshold can be achieved. The intermediate element may be more than two, three, or five times shorter than the supporting elements.

According to one embodiment of the invention, it is contemplated that the regulating body is formed as a ring. In particular, the regulating body may be an O-ring. Using O-rings is a common way to create flow rate regulators. Thus, the invention can be used for a large class of flow rate regulators.

According to one embodiment of the invention, it is contemplated that the regulating body is deformed laterally with respect to a direction of flow on the inflow side. This is particularly useful in combination with a regulating body in the form of a ring. In particular, the regulating body may be supported by at least one web arranged in the drain opening. This is an easy way to keep the regulating body at its working position.

According to one embodiment of the invention, it is contemplated that the supporting elements are part of an arrangement of protrusions and recessions forming a regulating profile that defines, together with the regulating body, the control gap. Thus, the supporting elements and, if applicable, the intermediate elements as well may be incorporated in the regulating profile. This keeps a dimension of the flow rate regulator as small as possible.

According to one embodiment of the invention, it is contemplated that in the at least one low-pressure region, a regulating profile, in particular the regulating profile describes above, forms a trough with tilted side walls. Thus, the sharp corners at supporting elements may be avoided so that the regulating body may contact the main body smoothly without or at least essentially without (e.g. such that the leaking flow is negligible compared to the total flow) leaving unwanted bleed holes above a certain pressure level.

According to one embodiment of the invention, it is contemplated that the regulating body is formed as a disc. The disc may be mounted in its center (like a washer) or at one or more regions at its periphery. Thus, the invention may be used at another important class of flow rate regulators, namely with disc-like regulating body.

According to one embodiment of the invention, it is contemplated that the regulating body is deformed along a direction of flow on the inflow side. This is particularly useful for disc-like regulating bodies. In particular, the regulating body may be supported by a shoulder, preferably at its center. It may be fixed by a pin that penetrates the regulating body. The pin may carry the shoulder. Thus, the regulating body may be kept at its working position.

According to one embodiment of the invention, it is contemplated that the supporting elements have centers which confine a disc-like region. In particular, the drain opening may be contained within said region.

According to one embodiment of the invention, it is contemplated that the drain opening is covered completely by the regulating body. Hence, as soon as the regulating body contacts a region on which the drain opening is formed, it will essentially close the drain opening.

According to one embodiment of the invention, it is contemplated that between a pair of adjacent supporting elements defining the high-pressure region, there is formed a continuous surface on the main body. Thus, the flow passes through the control gap in an essentially undisturbed manner.

According to one embodiment of the invention, it is contemplated that the drain opening has an essentially circular outer periphery. This allows an easy adaption between the regulating body and the drain opening.

According to one embodiment of the invention, it is contemplated that a control curve, in particular the control curve described above, of the flow rate regulator can be written as a sum of at least a control curve of the high-pressure region and a control curve of the low-pressure region. Given this, it may be established that a maximum of the control curve of the high-pressure region lies at a pressure above a pressure of an intersection point of the control curve of the high-pressure region with the control curve of the low-pressure region. Thus, an essentially high-pressure behavior may be defined. In addition or alternatively, a maximum of the control curve of the low-pressure region may lie at a pressure below a pressure of an intersection point of the control curve of the high-pressure region with the control curve of the low-pressure region. Thus, an essentially high-pressure behavior may be defined.

BRIEF DESCRIPTION OF THE DRAWINGS

The invention will now be described in more detail on the basis of exemplary embodiments, but is not limited to these exemplary embodiments. Further exemplary embodiments result from combining the features of individual claims or a plurality of claims with one another and/or with individual features or a plurality of features of the exemplary embodiments. In the drawings:

FIG. 6 shows a detail of FIG. 5D.

DETAILED DESCRIPTION

Figure 1:
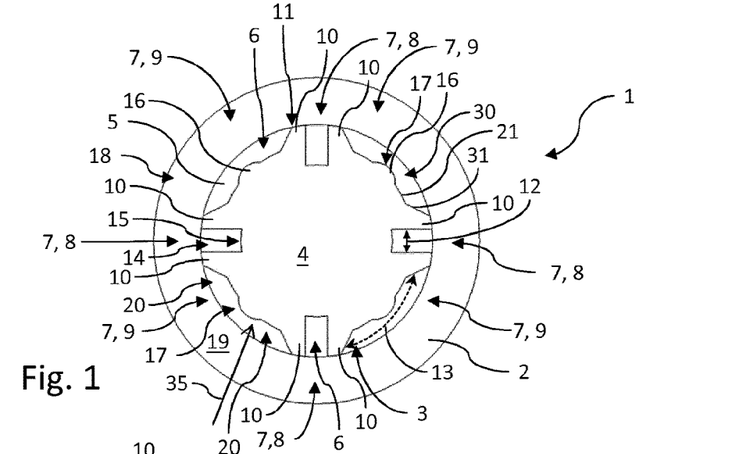
FIG. 1 shows a first example of a flow rate regulator according to the invention.

FIG. 1 shows a flow rate regulator 1 according to the invention. The flow rate regulator 1 has a regulating body 2 that is deformable under water pressure. The regulating body 2 is made of an elastic material, e.g. rubber.

The regulating body 2 is mounted on the inflow side 3 of a main body 4.

Between the main body 4 and the regulating body 2, a control gap 5 is formed.

Downstream of the control gap 5, an essentially circular drain opening 6 is formed through which the water will flow out of the flow rate regulator 1.

Depending on the pressure applied on the regulating body 2, i.e. the inflow pressure or a pressure difference across the flow rate regulator 1, the regulating body 2 will be deformed. This results in a change of the area of the control gap 5, measured perpendicularly with respect to the direction of flow in the control gap 5.

As already mentioned, behind the control gap 5 there is the drain opening 6. Water or the like fluid will enter the flow rate regulator 1 through control gap 5 and leave the flow rate regulator 1 through the drain opening 6.

As explained in more detail below, the regulating body 2 is divided into regions 7 that are adjacent to each other.

The regions 7 can be grouped as high-pressure regions 8 and low-pressure regions 9.

Between two adjacent regions 7, a supporting element 10 is arranged to support the regulating body 2 at low pressures even below 0.1 bar. This is achieved by letting the supporting element 10 contact the regulating body 2 at zero pressure. This contact effectively decouples the portions of the regulating body 2 in adjacent regions 7.

The supporting elements 10 are formed integrally with the main body 2 as fixed protrusions 11.

The supporting elements 10 which define a high-pressure region 8 are arranged closer together than supporting elements 10 which define a low-pressure region 9. Thus, a distance 12, in this case measured as an angular distance, between supporting elements 10 confining a high-pressure region 8, is considerably shorter than a distance 13, also in this case measured as an angular distance, between supporting elements 10 confining a low-pressure region 9. In other embodiments, the distances 12, 13 may be measured along straight lines.

Hence, in FIG. 1, the regulating body 2 spans a smaller distance 12 in a high-pressure region 8 while it spans a larger distance 13 in a low-pressure region 9.

As will be described in more detail below, the high-pressure region 8 is formed by a groove 14. The depth of this groove 14 is such that the regulation body 2 will not, even at very high pressures achievable in sanitary systems, touch its ground 15.

In this example, this is achieved by a rectangular cross section of the groove 14 wherein the width is much smaller than the height of the groove 14.

The supporting elements 10 that define the low-pressure region 9 as a boundary are spaced apart such that the regulating body 2 will, above a certain pressure threshold, contact the main body 4 along the full or essentially full size of the low-pressure region 9. Thus, no water will flow through the control gap 5 in the low-pressure region 9 above said pressure threshold.

To achieve this, the supporting elements 10 fall off less rapidly on the low-pressure side than they do in the high-pressure side. Thus, the contour forming the control gap 5 describes a trough 30 with tilted side walls 31, 32.

In the low-pressure region 9, there is an intermediate element 16 in addition. This is formed by a protrusion 17 of smaller size compared to the supporting elements 10. The height of the intermediate element 16 may be, for example, less than half or less than one third the height of the supporting elements 10.

The height of the intermediate element 16 is such that it does not contact the regulating body 2 at zero pressure, i.e. in an undeformed state of the regulating body 2.

Figure 2:
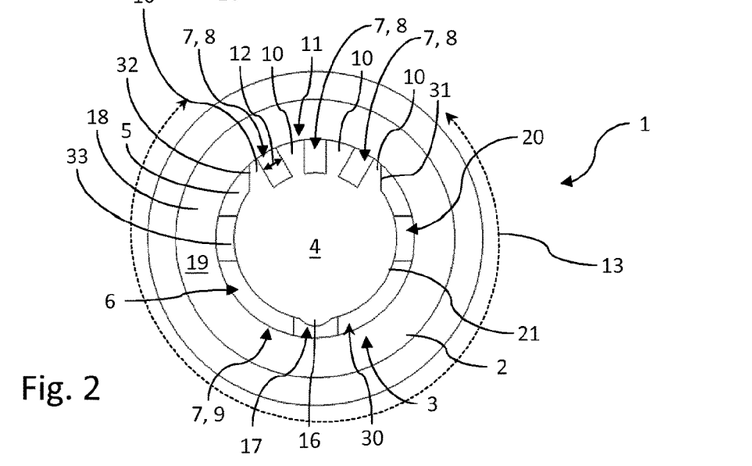
FIG. 2 shows a second example of a flow rate regulator according to the invention.

FIG. 2 shows a further exemplary embodiment according to the invention. Components and functional units that are structurally and/or functionally similar or identical to the preceding exemplary embodiment are denoted by the same reference signs and not described separately. The information given with respect to FIG. 1 therefore applies, mutatis mutandis, to FIG. 2.

While in the embodiment of FIG. 1, high-pressure regions 8 and low-pressure regions 9 are arranged such that they form an alternating sequence, in the embodiment of FIG. 2 there is a sequence of several consecutive high-pressure regions 8 that are adjacent to each other. In other words, the apparent fourfold symmetry of the arrangement of FIG. 1 is not necessary to achieve the benefits of the invention.

However, the arrangement of FIG. 1 is preferred for most case due to its simplicity in design.

Further, in the embodiment of FIG. 2, one single low-pressure region is formed that stretches as far as possible, i.e. more than 270°.

Other embodiments may have more or less than three high-pressure regions.

Figure 3:
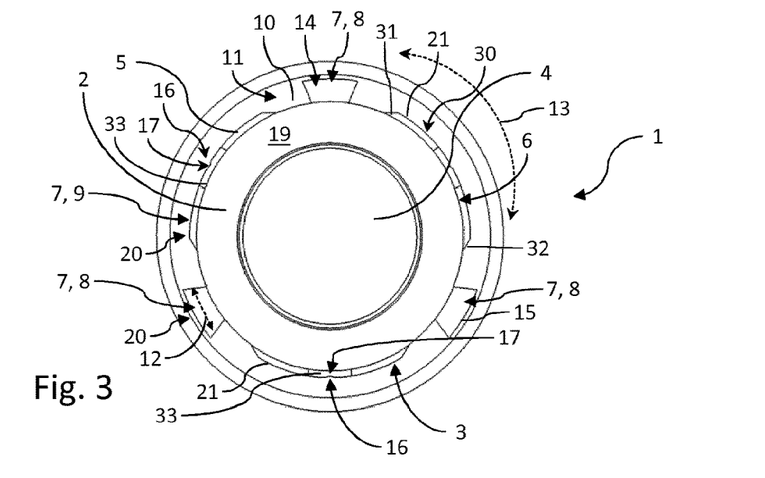
FIG. 3 shows a third example of a flow rate regulator according to the invention.

FIG. 3 shows a third exemplary embodiment according to the invention. Components and functional units that are structurally and/or functionally similar or identical to the preceding exemplary embodiment are denoted by the same reference signs and not described separately. The information given with respect to FIGS. 1 and 2 therefore applies, mutatis mutandis, to FIG. 3.

While in the embodiments of FIGS. 1 and 2 the protrusions 11, 17 are projecting in a radially outward manner, in the embodiment of FIG. 3 they project inwardly.

In this case, the high-pressure regions have inwardly tilted side walls 31, 32 in order to further prevent the regulating body 2 from fully closing the control gap 5.

Such inwardly tilted side walls 31, 32 may be used in the other designs as well.

In other embodiments, some of the projections 11, 17 may be projecting outwardly while others may project inwardly.

Also, in other embodiments, there may be more than one low-pressure region 9, although in many case it suffices to have one low-pressure region 9.

Between adjacent protrusions 11, 17, there are formed recessions 20. The sequence of protrusions 11, 17 and recessions 20 define a regulating profile 21.

The flow rate regulators 1 of FIGS. 1 to 3 are of the ring type. The regulating bodies 2 are form as rings 18. In these examples, the rings 18 have a circular shape, so that the regulating bodies 2 can be O-rings 19.

Hence, the regulating body 2 is deformed in a direction perpendicular or laterally to the main direction of flow 35 (which is itself is parallel to the direction of view in FIGS. 1 to 3).

FIG. 2 shows webs 33 in the drain opening 6 on which the regulating body 2 rests. A similar construction is present in the other embodiments as well, although not shown there.

Figure 4:
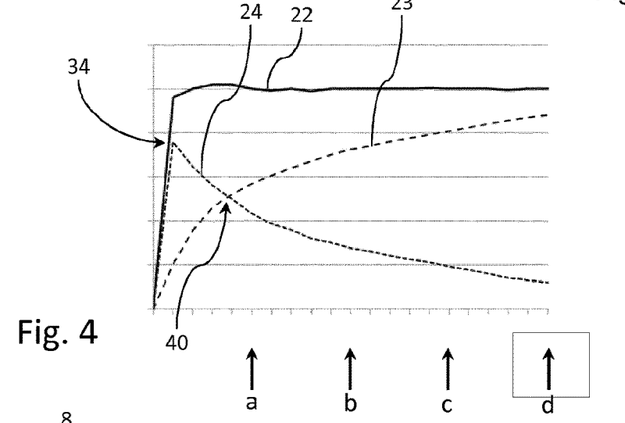
FIG. 4 shows a control curve for the flow rate regulator of FIG. 1, FIG. 5A to 5D show the flow rate regulator of FIG. 1 at different pressures a to d of FIG. 4.

FIG. 4 shows a control curve 22 of the flow rate regulator 1 of FIG. 1. Similar curves will apply for the flow rate regulators of FIGS. 2 and 3.

The control curve 22 shows the dependence of the flow rate through the drain opening 6 on the pressure difference across the flow rate regulator 1.

The control curve 22 is the sum of the control curve 23 of the high-pressure regions 8 and the control curve 24 of the high-pressure regions 9. The control curve 23 of the high-pressure region 8 intersects the control curve 24 of the low-pressure region 9 at an intersection point 40.

Control curve 23 shows that the low-pressure region 9 does not contribute in an essential way above a pressure threshold approximately at c.

Thus, it can be seen that a maximum—here a limit value approximately at the constant flow level—of the control curve 23 of the high-pressure region 8 lies at a pressure above a pressure of the intersection point 40.

Likewise, a maximum—here the kink 34—of the control curve 24 of the low-pressure region 9 lies at a pressure below the pressure of said intersection point 40.

FIGS. 5A through 5D show the corresponding deformation of the regulating body 2 at the respective pressures a (FIG. 5A), b (FIG. 5B), c (FIG. 5C), d (FIG. 5D) of FIG. 4.

It is apparent that at pressure c (FIG. 5C), the control gap 5 is essentially closed in the low-pressure regions 9. The remaining area in the low-pressure regions 9 may be less than one third of the total cross sectional area of the control gap 5 at this pressure. Hence, essentially all flow is going through the high-pressure regions 8.

Figure 5A:
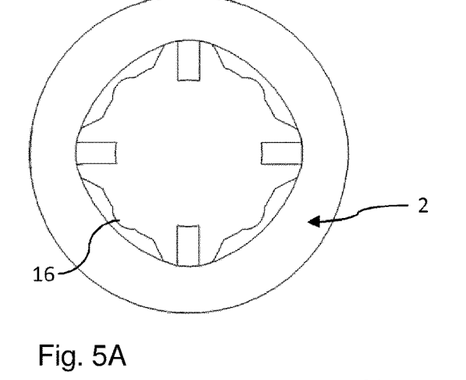
Figure 5B:
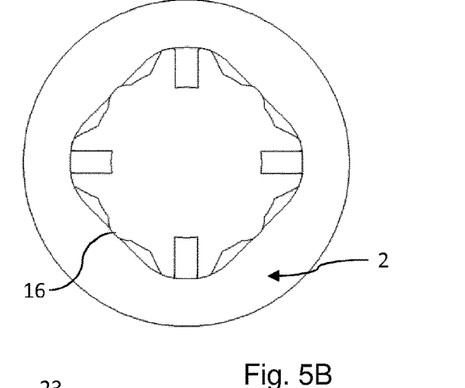
Figure 5C:
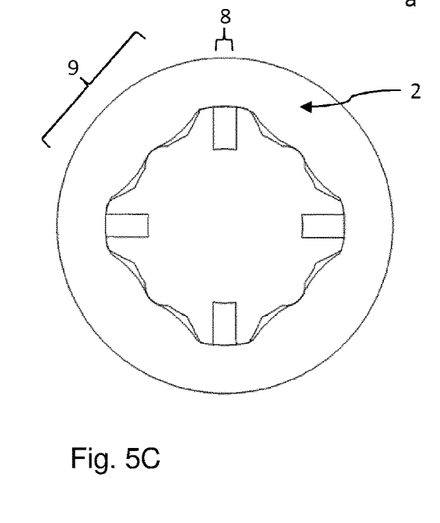
Figures 5D, 6:
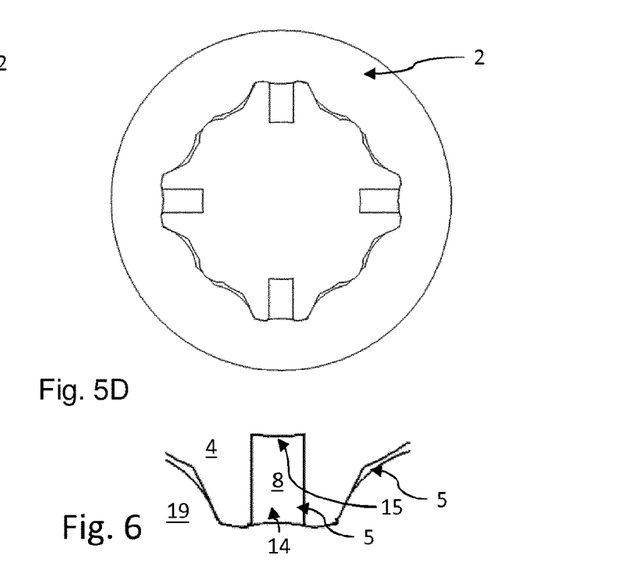

In FIG. 6 it is shown that the regulating body 2 is deformed to intrude in the cross section area of the high-pressure regions 8 in order to achieve a constant flow rate at high pressure values.

In FIG. 5B, at pressure b, the intermediate element 16 contacts the regulating body 2 whereas in FIG. 5A, at pressure a, it does not. This additional support modifies the control curve 24 in such a way that the slope is less steep for higher pressures. This in turn allows to adjust the high-pressure end of the control curve 24 such that it matches that of control curve 23 in order to yield a constant flow rate while at the same time being able to achieve a steep slope at the intermediate pressure ranges (above the kink 34) in order to achieve that constant flow rate also at such pressure levels.

At pressure levels below the kink 34 the regulating body 2 is not deformed.

Figures 7, 8, 9:
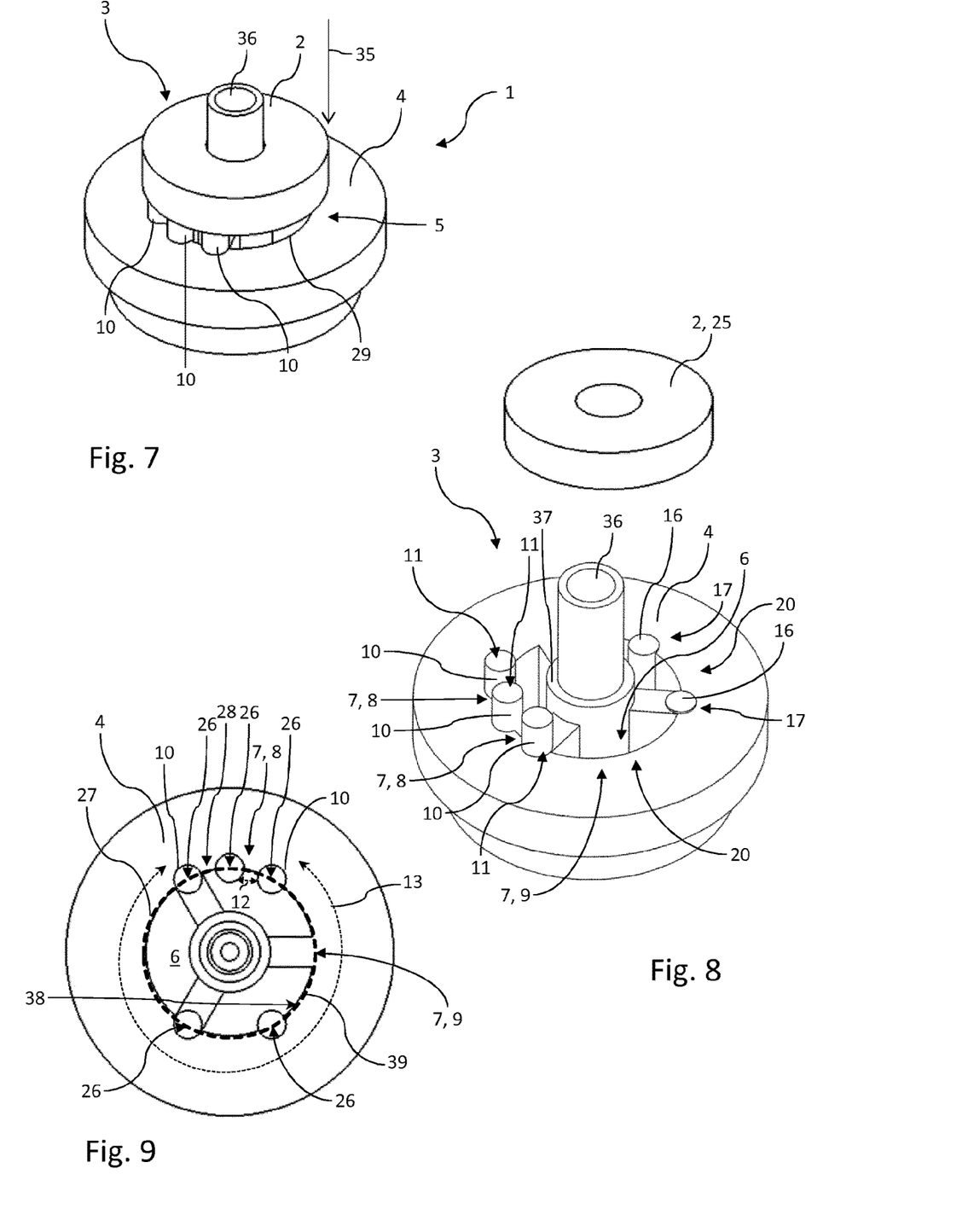
FIG. 7 shows a fourth example of a flow rate regulator according to the invention.
FIG. 8 shows the flow rate regulator of FIG. 7 with regulating body removed.
FIG. 9 shows the flow rate regulator of FIG. 7 without regulating body in a view from above in the direction of flow.

FIGS. 7 to 9 show a forth exemplary embodiment according to the invention. Components and functional units that are structurally and/or functionally similar or identical to the preceding exemplary embodiment are denoted by the same reference signs and not described separately. The information given with respect to FIGS. 1 to 3 therefore applies, mutatis mutandis, to FIGS. 7 to 9.

The flow rate regulator 1 of FIGS. 7 to 9 is of the disc type. The regulating body 2 is shaped like a washer and made of elastically deformable material like rubber.

The regulating body 2 is set on a pin 36 and rests on a shoulder 37. The pin 36 penetrates the regulation body 2 at a central hole.

Hence, the deformation of the regulating body 2 is—unlike to FIGS. 1 to 6—in or longitudinally to the main direction of the flow 35 (i.e. the direction of view in FIG. 9).

The supporting elements 10 are of identical height at or above the position of the shoulder 37. Thus, the supporting elements 10 contact the regulating body 2 already at zero pressure.

In FIG. 9, it is shown that the centers 26 of the supporting elements 10 and the intermediate elements 16 define a disc-like region 27 which contains the drain opening 6.

The regulating body 2 extends somewhat beyond that disc-like region 27 so that it covers the drain opening 6.

The drain opening 6, in turn, has an essentially (where the supporting elements 10 and the intermediate elements 16 are neglected) circular outer periphery 29.

Moreover, it can be seen that in the low-pressure region 9 an outer contour 38 of the drain opening 6 describes a section of a circle 39. In this example, the circle 39 coincides with a boundary of the disc-like region 27. The drain opening 6 is fully contained within said circle 39, while the contact surface 38 extends beyond it.

Between two adjacent supporting elements 10, a continuous surface 28 is formed on the main body 4.

The height of supporting elements 10 in relation to the distance 12 is such that the regulating body 2 cannot reach the continuous surface 28. Hence, the control gap 5 remains at least partially open at all pressure levels.

It can be seen from the drawings that there are two intermediate elements 16 in one low-pressure region 9. In other embodiments, other numbers of intermediate elements 16 are arrange within each low-pressure region 9.

Figure 10:
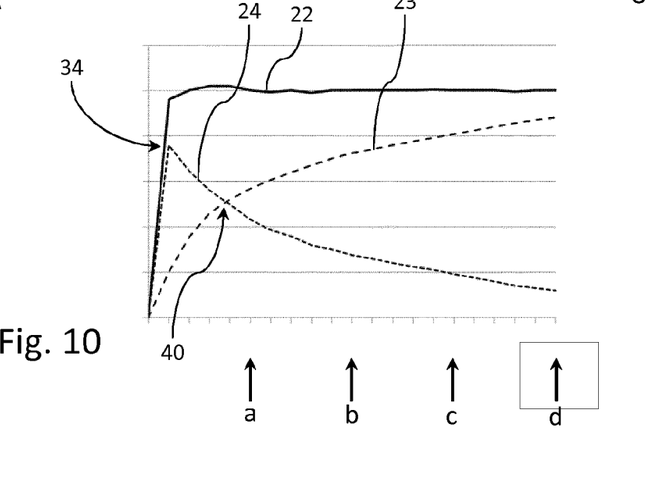
FIG. 10 shows a control curve for the flow rate regulator of FIG. 7, FIG. 11A to 11D show the flow rate regulator of FIG. 7 at different pressures a to d of FIG. 10 in order to illustrate deformation of the regulating body in the low-pressure region.

FIG. 10 shows a control curve 22 of the flow rate regulator 1 of FIGS. 7 to 9. The explanations given to FIG. 4 also apply here.

FIGS. 11A through 11D show the corresponding deformation of the regulating body 2 at the respective pressures a (FIG. 11A), b (FIG. 11B), c (FIG. 11C), d (FIG. 11D) of FIG. 10 when the low-pressure region 9 of flow rate regulator 1 is viewed.

It can be seen that the effect of the intermediate elements 16 starts between pressures b and c. Beyond pressure level c, there is no substantial change in the cross sectional area of the control gap 5 in the low-pressure region 9. That part of the control gap 5 does not contribute to the overall flow rate at this pressure level.

Figure 12:
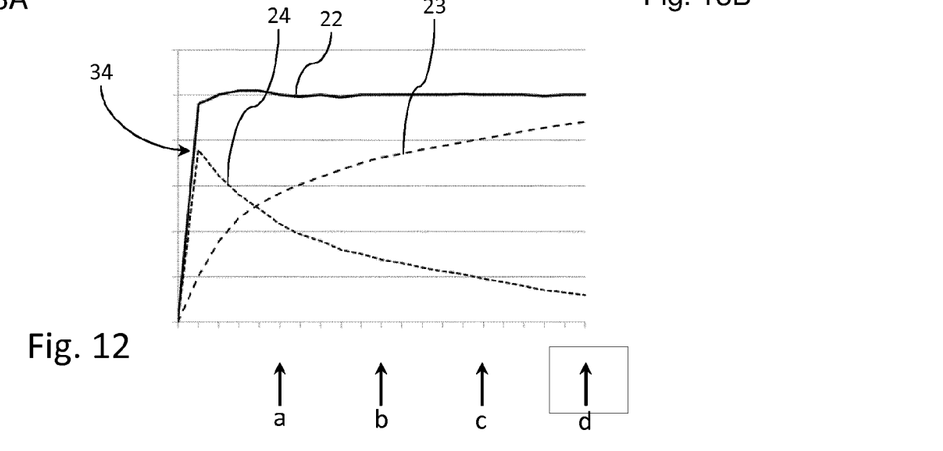
FIG. 12 shows the control curve of FIG. 10 for the flow rate regulator of FIG. 7, and FIG. 13A to 13D show the flow rate regulator of FIG. 7 at different pressures a to d of FIG. 12 in order to illustrate deformation of the regulating body in the low-pressure region.

FIGS. 13A through 13D show the corresponding deformation of the regulating body 2 at the respective pressures a (FIG. 13A), b (FIG. 13B), c (FIG. 13C), d (FIG. 13D) of FIG. 10 when the high-pressure region 8 of flow rate regulator 1 is viewed. To assist in reading, the content of FIG. 10 is repeated as FIG. 12.

Figure 13A:
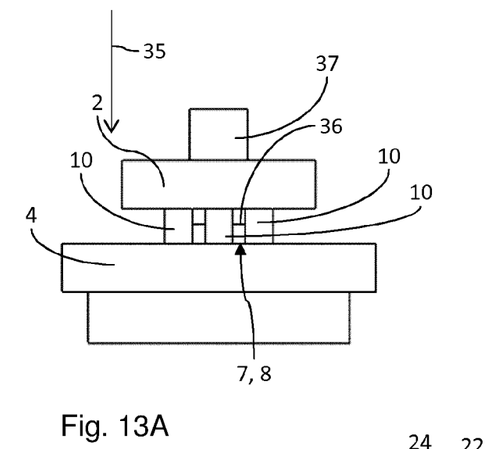
Figure 13B:
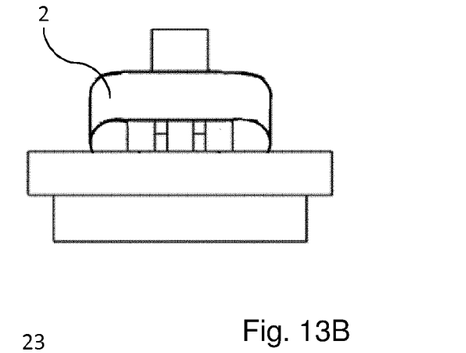
Figure 13C:
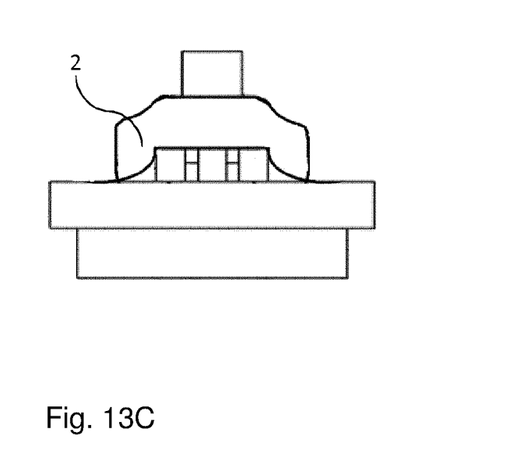
Figure 13D:
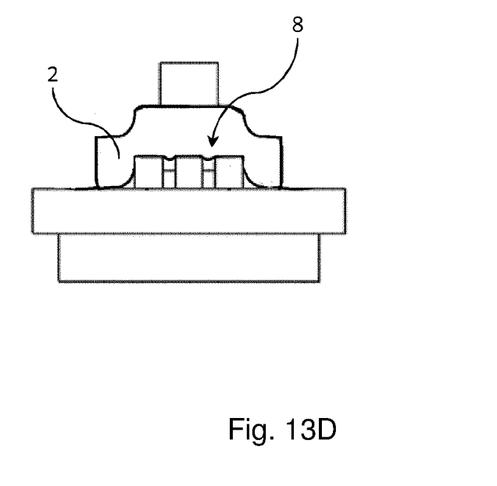

It can be seen read of the control curve 23 that there are deformations of the regulating body 2 in the high-pressure regions 8 although they are barely visible. FIG. 13D indicates that at very high-pressure levels, substantial deformations will occur. Those deformations, however, will not lead to a contact between the regulating body 2 and the continuous surface 28.

Figure 11A:
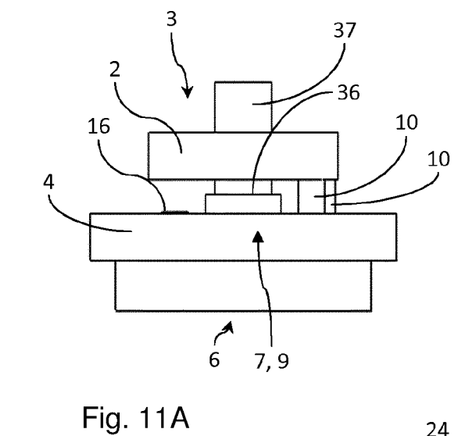
Figure 11B:
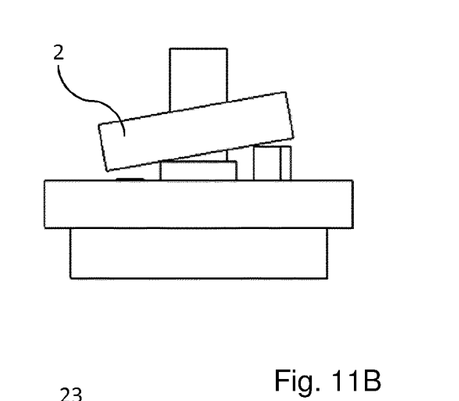
Figure 11C:
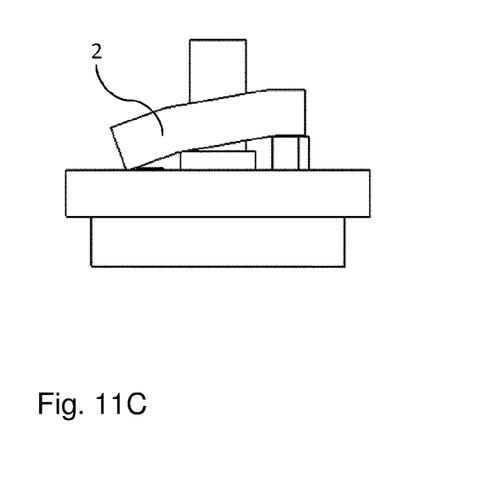
Figure 11D:
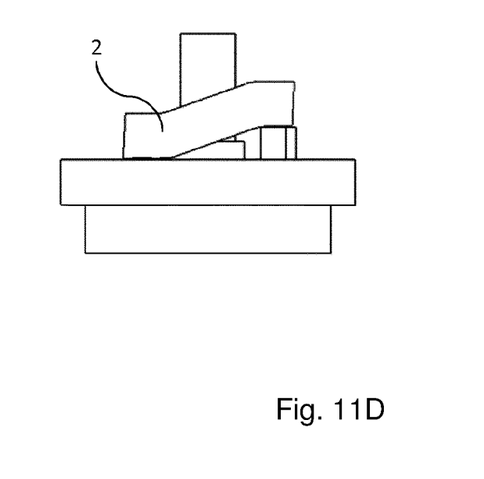

FIG. 11A clearly shows that the height of the intermediate element 16 is less than ⅕ of the height of the supporting elements 10.

According to the invention, it is proposed to decouple regions 7 of a regulating body 2 of a flow rate regulator 1 such that one of the decoupled regions 7 forms a low-pressure region 9 while another of the decoupled regions 7 defines a high-pressure region 8.

LIST OF REFERENCE NUMERALS 1 flow rate regulator
2 regulating body
3 inflow side
4 main body
5 control gap
6 drain opening
7 region
8 high-pressure region
9 low-pressure region
10 supporting element
11 protrusion
12 distance
13 distance
14 groove
15 ground of 14
16 intermediate element
17 protrusion
18 ring
19 O-ring
20 recessions
21 regulating profile
22 control curve
23 control curve of the high-pressure regions
24 control curve of the low-pressure regions
25 disc
26 center
27 disc-like region
28 continuous surface
29 periphery
30 trough
31 side wall
32 side wall
33 web
34 kink
35 main direction of flow
36 pin
37 shoulder
38 contour
39 circle
40 intersection point

The invention claimed is:

1. A flow rate regulator (1) comprising:
a main body (4);
a deformable O-ring regulating body (2) arranged on an inflow side (3) with respect to the main body (4);
a control gap (5) formed between the regulating body (2) and the main body (4);
at least one drain opening (6) arranged downstream of the control gap (5) formed in the main body (4);
the O-ring regulating body (2) being adapted to provide an inflow pressure-dependent deformation that defines a clear opening area of the control gap (5);
the control gap (5) is divided into at least two separate regions such that the O-ring regulating body (2) is radially deformable in the at least two regions (7) such that one of the two separate regions (7), which acts as a high-pressure region (8), regulates functioning of the flow rate regulator (1) at a high pressure while another one of the two separate regions (7), which acts as a low-pressure region (9), regulates functioning of the flow rate regulator (1) at a low pressure, wherein the high-pressure region and the low-pressure region are arranged adjacent to each other along an inner circumference of the O-ring regulating body.

2. The flow rate regulator (1) according claim 1, further comprising supporting elements (10) that divide the control gap (5) into the at least two separate regions (7) by the supporting elements (10) supporting the O-ring regulating body (2) at essentially zero inflow pressure.

3. The flow rate regulator (1) according to claim 2, wherein the supporting elements (10) are formed on the main body (4).

4. The flow rate regulator (1) according to claim 2, wherein a distance (12) between supporting elements (10) defining the high-pressure region (8), with the distance (12) being measured within the high-pressure region (8), is smaller than a second distance (13) between supporting elements (10) defining the low-pressure region (9), with the second distance (13) being measured within the low-pressure region (9).

5. The flow rate regulator (1) according to claim 2, further comprising at least one intermediate element (16) in the low-pressure region (9), the at least one intermediate element (16) is disposed which is dimensioned such that the at least one intermediate element (16) does not contact the O-ring regulating body (2) below an intermediate pressure predetermined between the high and low pressures and the at least one intermediate element (16) supports the O-ring regulating body (2) above the intermediate pressure.

6. The flow rate regulator (1) according to claim 5, wherein, the at least one intermediate pressure is below a pressure range in which the high-pressure region (8) regulates the behavior below the pressure threshold.

7. The flow rate regulator (1) according to claim 5, wherein the O-ring regulating body (2) is deformed laterally with respect to a direction of flow (35) on the inflow side (3).

8. The flow rate regulator (1) according to claim 2, wherein the supporting elements (10) are part of an arrangement of protrusions (11, 17) and recessions (20) forming a regulating profile (21) that defines, together with the O-ring regulating body (2), the control gap (5).

9. The flow rate regulator (1) according to claim 8, wherein in the at least one low-pressure region (9), the regulating profile (21) forms a trough (30) with tilted side walls (31, 32).

10. The flow rate regulator (1) according to claim 1, wherein the low-pressure region (9) is configured to be closed above a pressure threshold.

11. The flow rate regulator (1) according to claim 1, wherein the drain opening (6) has at least one of an essentially circular outer periphery (29) or, in the low-pressure region (9), has an outer contour (38) that describes a section of a circle (39) which contains the drain opening (6).

12. A flow rate regulator (1) comprising:
a main body (4);
a deformable O-ring regulating body (2) arranged on an inflow side (3) with respect to the main body (4);
a control gap (5) formed between the regulating body (2) and the main body (4);
at least one drain opening (6) arranged downstream of the control gap (5) formed in the main body (4);
the O-ring regulating body (2) being adapted to provide an inflow pressure-dependent deformation that defines a clear opening area of the control gap (5);
the control gap (5) is divided into at least two separate regions such that the O-ring regulating body (2) is radially deformable in the at least two regions (7) such that one of the two separate regions (7), which acts as a high-pressure region (8), regulates functioning of the flow rate regulator (1) at a high pressure while another one of the two separate regions (7), which acts as a low-pressure region (9), regulates functioning of the flow rate regulator (1) at a low pressure,
wherein the high-pressure region (8) is configured to remain at least partially open at all pressures.

13. The flow rate regulator (1) according to claim 12, wherein, in the high-pressure region (8), the main body (4) forms a groove (14) which has a depth such that the O-ring regulating body (2) remains at a distance from a base (15) of the groove (14) at all pressures.

14. A flow rate regulator (1) comprising:
a main body (4);
a deformable O-ring regulating body (2) arranged on an inflow side (3) with respect to the main body (4);
a control gap (5) formed between the regulating body (2) and the main body (4);
at least one drain opening (6) arranged downstream of the control gap (5) formed in the main body (4);
the O-ring regulating body (2) being adapted to provide an inflow pressure-dependent deformation that defines a clear opening area of the control gap (5);
the control gap (5) is divided into at least two separate regions such that the O-ring regulating body (2) is radially deformable in the at least two regions (7) such that one of the two separate regions (7), which acts as a high-pressure region (8), regulates functioning of the flow rate regulator (1) at a high pressure while another one of the two separate regions (7), which acts as a low-pressure region (9), regulates functioning of the flow rate regulator (1) at a low pressure, wherein a control curve (22) of the flow rate regulator (1) is formed by a sum of at least a control curve (23) of the high-pressure region (8) and a control curve (24) of the low-pressure region (9), a maximum of the control curve (23) of the high-pressure region (8) lies at a pressure above a pressure of an intersection point (40) of the control curve (23) of the high-pressure region (8) with the control curve (24) of the low-pressure region (9), or a maximum of the control curve (24) of the low-pressure region (9) lies at a pressure below a pressure of an intersection point (40) of the control curve (23) of the high-pressure region (8) with the control curve (24) of the low-pressure region (9) or both.

\* \* \* \* \*